Patented Mar. 23, 1937

2,074,757

UNITED STATES PATENT OFFICE 2,074,757

3(N-SODIUM FORMALDEHYDE SULPHOXYLATE) AMINO-4-HYDROXY-PHENYL - ARSONIC ACID

George W. Raiziss and Abraham I. Kremens, Philadelphia, Pa., assignors to Abbott Laboratories, North Chicago, Ill., a corporation of Illinois No Drawing. Application November 18, 1935,
Serial No. 50,364

3 Claims. (Cl. 260—14)

Our invention relates to a derivative of amino-hydroxyl phenyl arsonic acid which has been found to possess remarkable therapeutic properties, particularly in the treatment of such diseases as *Trichomonas vaginitis*. It has also therapeutic effects in amoebic dysentery and syphilis.

Our improved compound is formed by the combination of amino-hydroxy phenyl arsonic acid and sodium formaldehyde sulphoxylate. Aside from its therapeutic efficiency, the product is of considerable advantage in that it is quite stable for substantial periods of time, is water soluble, and is neutral or slightly alkaline.

The following is an example of a method whereby the material may be prepared:

*Example*

Twenty-five grams of 3 amino-4-hydroxy phenyl arsonic acid are suspended in 150 cc. of methyl alcohol and dissolved by passing into the mixture hydrochloric acid gas. A solution of 12.5 grams of sodium formaldehyde sulphoxylate in 20 cc. of water is added and mixed for about half an hour.

Sodium carbonate solution is then added gradually until the mixture is slightly alkaline to litmus paper.

The new compound is precipitated by a mixture of ether and methyl alcohol. It is filtered off and dried in vacuo in the usual manner.

At the present time we are unable to state definitely the nature of the reaction outlined above or the structure of the product formed thereby, except to say that, in the resulting product, the arsenic retains its pentavalent condition.

It should be understood that we do not consider ourselves limited to the specific details set forth above but intend that the scope of our invention should be determined from the following claims, which should be interpreted as broadly as the state of the art will permit.

We claim as our invention:

1. A composition of matter formed by the interaction of a minor proportion of sodium formaldehyde sulphoxylate with a major proportion of amino-hydroxy phenyl arsonic acid, the arsenic atom of said composition being pentavalent.

2. A composition of matter formed by the interaction of a minor proportion of sodium formaldehyde sulphoxylate with a major proportion of 3-amino-4-hydroxy phenyl arsonic acid, the arsenic atom of said composition being pentavalent.

3. A composition of matter having the arsenic atom in pentavalent form consisting of the reaction product of about 1 part of sodium formaldehyde sulphoxylate and about 2 parts of 3-amino-4-hydroxy-phenyl-arsonic acid.

GEORGE W. RAIZISS.
ABRAHAM I. KREMENS.